(12) United States Patent
Soga et al.

(10) Patent No.: US 7,097,698 B2
(45) Date of Patent: *Aug. 29, 2006

(54) INK-JET RECORDING INK, INK CARTRIDGE AND RECORDING DEVICE USING SUCH INK

(75) Inventors: Mamoru Soga, Osaka (JP); Takuma Takasu, Fukuoka (JP); Hidekazu Arase, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/378,706

(22) Filed: Mar. 4, 2003

(65) Prior Publication Data

US 2003/0197769 A1    Oct. 23, 2003

(30) Foreign Application Priority Data

Mar. 5, 2002    (JP) ............................... 2002-058802
Mar. 5, 2002    (JP) ............................... 2002-058813
May 15, 2002    (JP) ............................... 2002-139791

(51) Int. Cl.
   C09D 11/02    (2006.01)
   G01D 11/00    (2006.01)

(52) U.S. Cl. ............... 106/31.27; 106/31.6; 106/31.58; 106/31.86; 106/31.47; 106/31.77; 347/100

(58) Field of Classification Search ............ 106/31.27, 106/31.6, 31.58, 31.86, 31.47, 31.77; 347/100
See application file for complete search history.

(56) References Cited

U.S. PATENT DOCUMENTS 5,558,700 A *  9/1996 Shibahashi et al. ...... 106/31.15
5,972,082 A * 10/1999 Koyano et al. .......... 106/31.27

(Continued)

FOREIGN PATENT DOCUMENTS

JP    10-212439 A    8/1998

(Continued)

Primary Examiner—J. A. Lorengo
Assistant Examiner—Veronica F. Faison
(74) Attorney, Agent, or Firm—Harness, Dickey & Pierce, P.L.C.

(57) ABSTRACT

In order to improve the water-resisting property of an image formed on a recording medium such as recording paper and plain paper by using an ink-jet recording ink, while also improving the light-resisting property of the image, an ink-jet recording ink, which contains a color material, water, a moisture-retaining agent, an organic silicon compound and an ultraviolet-ray absorbing agent, is allowed to contain an organic silicon compound in a range of 0.1 parts by weight to 50 parts by weight and an ultraviolet-ray absorbing agent in a range of 0.1 parts by weight to 10 parts by weight with respect to 100 parts by weight of the ink. The ultraviolet-ray absorbing agent is at least one compound selected from the group consisting of benzophenone-based, benzotriazole-based, cyanoacrylate-based and oxalic acid anilide-based compounds. Light energy of ultraviolet rays is converted to kinetic energy, heat energy and the like by the ultraviolet-ray absorbing agent at a predetermined concentration contained in the ink to prevent an amino group in the organic silicon compound from attacking an azo group in the color material due to the application of the ultraviolet rays. Alternatively, an ink-jet recording ink, which contains a color material, water, a moisture-retaining agent and an organic silicon compound, is arranged so that the organic silicon compound contains an ultraviolet-ray absorbing part, and the ultraviolet-ray absorbing part is prepared as at least one functional group selected from the group consisting of benzophenone-based, benzotriazole-based, cyanoacrylate-based and oxalic acid anilide-based functional groups. Alternatively, the ink is allowed to further contain an ultraviolet-ray absorbing agent having an acidic group.

8 Claims, 7 Drawing Sheets

U.S. PATENT DOCUMENTS

| | | | |
|---|---|---|---|
| 6,007,610 A * | 12/1999 | Matzinger et al. | 106/14.05 |
| 6,059,871 A * | 5/2000 | Boils et al. | 106/31.57 |
| 6,087,416 A * | 7/2000 | Pearlstine et al. | 523/160 |
| 6,123,758 A * | 9/2000 | Colt | 106/31.43 |
| 6,143,807 A * | 11/2000 | Lin et al. | 523/161 |
| 6,153,001 A * | 11/2000 | Suzuki et al. | 106/31.65 |
| 6,264,730 B1 * | 7/2001 | Matsumura et al. | 106/31.43 |
| 6,348,091 B1 * | 2/2002 | Affeldt et al. | 106/504 |
| 6,419,732 B1 * | 7/2002 | Matsumura et al. | 106/31.75 |
| 6,569,511 B1 * | 5/2003 | Smith et al. | 428/32.1 |
| 6,676,735 B1 * | 1/2004 | Oki et al. | 106/31.46 |
| 6,803,395 B1 * | 10/2004 | Smith et al. | 523/160 |
| 2003/0137570 A1 * | 7/2003 | Smith et al. | 347/100 |
| 2003/0213403 A1 * | 11/2003 | Soga et al. | 106/31.27 |
| 2003/0221586 A1 * | 12/2003 | Arase et al. | 106/31.27 |

FOREIGN PATENT DOCUMENTS

| | | |
|---|---|---|
| JP | 11-293167 A | 10/1999 |
| JP | 11-315231 A | 11/1999 |
| JP | 2000-178494 A | 6/2000 |
| JP | 2000-290322 A | 10/2000 |

* cited by examiner

INK-JET RECORDING INK, INK CARTRIDGE AND RECORDING DEVICE USING SUCH INK

BACKGROUND OF THE INVENTION

The present invention relates to an ink-jet recording ink that is suitably applied to ink-jet recording, an ink cartridge and a recording device using such an ink.

Conventionally, with respect to the ink used for ink-jet recording of this type, an ink containing a dye serving as a color material, a moisture-retaining agent, a penetrating agent and water has been well known. When an image is formed on a recording medium such as recording paper and the like by using an ink containing a dye, a problem is raised in the water-resisting property of the image, that is, in that the dye oozes into water when the image gets wet with water. In particular, when plain paper (commonly-used commercial paper, more specifically, paper which is used in a copying machine in an electrophotographic system, and is not intended to provide optimal structure, composition, characteristics and the like for use in ink-jet recording) is used for the recording, the water-resisting property deteriorates seriously.

Therefore, as described in patent gazettes, for example, Japanese Patent Applications Laid-Open Nos. 10-212439, 11-293167, 11-315231 and 2000-178494, an ink-jet recording ink has been proposed in which a hydrolytic silane compound (organic silicon compound) is contained so as to improve the water-resisting property in an image on a recording medium. In other words, when ink droplets adhere to the recording medium and moisture (solvent) evaporates or permeates into the recording medium, the above-mentioned silane compound remaining on the recording medium is subjected to a condensation polymerizing reaction so that the resulting silane compound of the condensation polymerizing reaction surrounds the dye; thus, even when the image on the recording medium such as recording paper gets well with water, it is possible to prevent the dye from oozing into water, and consequently to improve the water-resisting property of the image.

However, although the above-mentioned conventional arrangement provides sufficient effects to improve the water-resisting property, it fails to provide a sufficient light resistance to the image, and the resulting problem is that, after an image formed in this method has been stored for a long period, fading occurs in the image. In other words, when an image such as a printed matter formed on a recording medium such as recording paper by using this waterproof ink is subjected to irradiation with light (ultraviolet rays) such as sun light and light from a fluorescent lamp, the organic silicon compound contained in the waterproof ink attacks the color material due to the light energy to decompose the color material structure to cause a change in hues and degradation in image density, resulting in fading in the image.

The mechanism of this color material decomposition is explained as follows: as shown in FIG. 7, when ultraviolet rays are directed to a conventional waterproof ink containing an organic silicon compound and a color material, an amino group ($-NH_2$) contained in the organic silicon compound in the ink attacks an azo group ($-N=N-$) of the color material through the light energy thereof, and changes the double bond of the azo group to a single bond, as shown in FIG. 8A, or causes a cleavage in the double bond as shown in FIG. 8B; consequently, it is considered that these cause a decomposition in the color material structure, and result in a change in hues and a reduction in the image density.

The objective of the present invention is to provide an inkjet recording ink containing a water soluble substance that is subjected to a condensation polymerizing reaction without water by preventing a color material from denaturing due to an organic silicon compound added to the ink so as to apply a water-resisting property to the ink, and also to improve the water resistance of an image on a recording medium (in particular, plain paper) formed by using the ink-jet recording ink, while improving the light-resisting property of the image.

SUMMARY OF THE INVENTION

In order to achieve the above-mentioned objective, the present invention allows an ink to contain an organic silicon compound and an ultraviolet-ray absorbing agent at a predetermined concentration ratio with respect to the entire ink.

More specifically, in accordance with the present invention, an ink-jet recording ink, which contains a color material, water, a moisture-retaining agent, an organic silicon compound and a ultraviolet-ray absorbing agent, is designed so that the above-mentioned organic silicon compound is set to 0.1 parts by weight to 50 parts by weight, with the above-mentioned ultraviolet-ray absorbing agent being set to 0.1 parts by weight to 10 parts by weight, with respect to 100 parts by weight of the ink.

Moreover, in accordance with the present invention, preferably, the above-mentioned ultraviolet-ray absorbing agent is at least one member selected from the group consisting of benzophenone-based, benzotriazole-based, cyano-acrylate-based and oxalic acid anilide-based compounds.

Furthermore, in accordance with the present invention, preferably, the ink further contains a penetrating agent. With this arrangement, the ink solvent, composed of the moisture-retaining agent, the penetrating agent and water, is allowed to permeate into the recording medium quickly after the ink has adhered to the recording medium (for example, paper). With this arrangement, the condensation polymerizing reaction of the water soluble substance is quickly carried out so as to positively surround the color material (and ultraviolet-ray absorbing agent). Consequently, it becomes possible to further improve the water-resisting property of the image.

With the above-mentioned arrangement, since the organic silicon compound for improving the water-resisting property is contained in the ink, it becomes possible to improve the water-resisting property of the image formed by the ink on a recording medium such as recording paper. Moreover, the ultraviolet-ray absorbing agent having a predetermined concentration is contained in the ink; therefore, even when, upon irradiation with ultraviolet rays, the amino group of the above-mentioned organic silicon compound tries to attach the azo group of the color material, the light energy of the ultraviolet rays is converted to kinetic energy, heat energy and the like by the ultraviolet-ray absorbing agent having a predetermined concentration, with the result that the deterioration of the color material is suppressed, thereby preventing degradation in the light-resisting property. Thus, it becomes possible to achieve improvements of both of the ink water-resisting property and light-resisting property.

The concentration of the above-mentioned organic silicon compound of less than 0.1 parts by weight causes a reduction in the water resisting effect, failing to obtain sufficient effects; in contrast, the concentration thereof exceeding 50 parts by weight not only makes the water resisting effect reach a saturated state, but also causes a reduction in the optical concentration and degradation in the color stability. Therefore, it is set in a range of 0.1 parts by weight to 50 parts by weight.

Moreover, the concentration of the above-mentioned ultraviolet-ray absorbing agent of less than 0.1 parts by weight makes it difficult to suppress a reduction in the concentration of the color material due to light irradiation, failing to obtain sufficient results. In contrast, the concentration of the above-mentioned ultraviolet-ray absorbing agent exceeding 10 parts by weight not only makes the suppressing effect on the reduction in the color material concentration reach a saturated state, but also causes degradation in the color stability. Therefore, the addition of the ultraviolet-ray absorbing agent is set in a range of 0.1 parts by weight to 10 parts by weight.

Moreover, in the present invention, in order to achieve the above-mentioned objectives, the organic silicon compound contained in the ink may have an ultraviolet-ray absorbing part.

More specifically, in accordance with of the present invention, the ink-jet recording ink, which contains a color material, water, a moisture-retaining agent and an organic silicon compound, is designed so that at least one portion of the above-mentioned organic silicon compound has the ultraviolet-ray absorbing part.

In the present invention, the above-mentioned ultraviolet-ray absorbing part is prepared as a benzophenone-based functional group, a benzotriazole-based functional group, a cyanoacrylate-based functional group or an oxalic acid anilide-based functional group.

Moreover, in the present invention, preferably, the ink further contains a penetrating agent. With this arrangement, after the ink has adhered onto a recording medium, the ink solvent, composed of the moisture-retaining agent, the penetrating agent and water, is allowed to swiftly permeate into the recording medium so that the condensation polymerizing process of the water-soluble substances is carried out quickly, and also allowed to positively surround the color material (and the ultraviolet-ray absorbing agent); thus, it becomes possible to further improve the water-resisting property of the image.

Furthermore, in the present invention, preferably, the organic silicon compound containing the above-mentioned ultraviolet-ray absorbing part is contained at a concentration in a range of 0.1 parts by weight to 50 parts by weight with respect to 100 parts by weight of the ink.

In accordance with the arrangements of these inventions, since the organic silicon compound for increasing the water-resisting property is contained in the ink, it is possible to improve the water-resisting property of an image formed by the ink on a recording medium such as recording paper. Moreover, the above-mentioned organic silicon compound has the ultraviolet-ray absorbing part; therefore, even when, upon irradiation with ultraviolet rays, the amino group of the above-mentioned organic silicon compound tries to attach the azo group of the color material, the light energy of the ultraviolet rays is converted to kinetic energy, heat energy and the like by the ultraviolet-ray absorbing part in the same organic silicon compound, with the result that the deterioration of the color material is suppressed, thereby preventing degradation in the light-resisting property. Furthermore, the color material may be coated with the light-resisting organic silicon compound so as to be protected from light energy. With these arrangements, the light-resisting property can be improved in comparison with not only the case of the application of only the color material but also the case of the addition of an ultraviolet-ray absorbing agent to the water-proof ink; thus, it becomes possible to achieve improvements in both of the ink water-resisting property and light-resisting property.

When the organic silicon compound containing the ultraviolet-ray absorbing part has a concentration of less than 0.1 parts by weight, the synergistic effect of the water-resisting and light-resisting properties is reduced, failing to provide a sufficient effect. In contrast, the concentration of the organic silicon compound exceeding 50 parts by weight not only makes the synergistic effect of the water-resisting and light-resisting properties reach a saturated state, but also causes a reduction in the optical concentration and degradation in the color stability. Therefore, the concentration of the organic silicon compound containing the ultraviolet-ray absorbing part is preferably set in a range of 0.1 parts by weight to 50 parts by weight.

Moreover, in order to achieve the above-mentioned objectives, the ink-jet recording ink of the present invention, which contains a color material, a moisture-retaining agent, water and a water soluble substance that is subjected to a condensation polymerizing reaction without water, is allowed to further contain an ultraviolet-ray absorbing agent having an acidic group.

Here, the ultraviolet-ray absorbing agent is supposed to absorb ultraviolet rays to convert light energy thereof into heat energy and the like.

With this arrangement, when ink adheres onto a recording medium (for example, paper) as ink droplets, moisture evaporates and permeates into the recording medium to subject the water soluble substance to a condensation polymerizing reaction so that the condensation-polymerized reactant surrounds the color material. Thus, even when an image formed by the ink droplets on the recording medium gets wet with water, it is possible to prevent the color material from oozing into water, and consequently to ensure the water-resisting property of the image.

The above-mentioned ink contains the ultraviolet-ray absorbing agent so that, even when ultraviolet rays are applied on an image formed by the above-mentioned ink on a recording medium, the ultraviolet rays are absorbed by the ultraviolet-ray absorbing agent, and the light energy thereof is converted into heat energy and the like. Thus, it becomes possible to suppress deterioration of the color material, and consequently to prevent degradation in the light-resisting property.

In this case, the above-mentioned color material and the water soluble substance are located in the proximity of each other in the ink because of the interaction thereof; thus, when the water soluble substance is subjected to a condensation polymerizing reaction, the color material is surrounded by the condensation polymerized reactant. Moreover, since the ultraviolet-ray absorbing agent, contained in the ink, has an acidic group, the ultraviolet-ray absorbing agent is also located in the proximity of the water soluble substance in the ink because of the interaction with the water soluble substance. For this reason, when the above-mentioned water soluble substance is subjected to the condensation polymerizing reaction, not only the color material but also the above-mentioned ultraviolet-ray absorbing agent is surrounded by the condensation polymerized reactant. Thus, the ultraviolet-ray absorbing agent is located in the proximity of the color material on the recording medium so that it becomes possible to efficiently block irradiation of ultraviolet rays onto the color material, and consequently to greatly improve the light-resisting property.

Moreover, the ultraviolet-ray absorbing agent is surrounded by the water soluble substance; therefore, in the same manner as the color material, even when an image on a recording medium gets wet with water, it is possible to prevent the ultraviolet-ray absorbing agent from oozing into water. Consequently, even after the image on the recording medium has got wet with water, it becomes possible to suppress degradation in the light-resisting property.

In other words, in the case when the ultraviolet-ray absorbing agent has no acidic group, since the interaction between the ultraviolet-ray absorbing agent and the water soluble substance is weak, the ultraviolet-ray absorbing agent is not surrounded by the water soluble substance. For this reason, when an image on the recording medium gets wet with water, the ultraviolet-ray absorbing agent oozes into water, causing degradation in the light-resisting property. In contrast, in the present invention, since the ultraviolet-ray absorbing agent is allowed to have an acidic group, both of the color material and ultraviolet-ray absorbing agent are surrounded by the water soluble substance so that the color material and the ultraviolet-ray absorbing agent are positioned in the proximity of each other; thus, in addition to ensuring the water-resisting property in the image, it becomes possible to obtain a light-resisting property in a high level, and also to suppress degradation in the light-resisting property of an image even after the image on the recording medium has got wet with water.

In this case, the water soluble substance is preferably prepared as a hydrolytic silane compound. In other words, the silane compound is preferable from the view point of improving the water-resisting property, and also makes it possible to positively acquire the ultraviolet-ray absorbing agent, and to improve the light-resisting property.

Moreover, the above-mentioned ultraviolet-ray absorbing agent is preferably prepared as a benzophenone-based compound, a benzotriazole-based compound or a salicylate-based compound. With respect to an acidic group contained in the ultraviolet-ray absorbing agent, examples thereof include sodium sulfonate and sodium carboxylate, and of these, sodium sulfonate is preferably used from the viewpoint of solubility to water.

It is preferable for the above-mentioned ink to further contain a penetrating agent. With this arrangement, after the ink has adhered onto a recording medium (for example, paper), the solvent of the ink, composed of a moisture-retaining agent, the penetrating agent and water, is allowed to swiftly permeate into the recording medium. Thus, the water soluble substance is quickly subjected to a condensation polymerizing reaction, and allowed to positively surround the color material (and the ultraviolet-ray absorbing agent). Consequently, it becomes possible to further improve the water-resisting property of the image.

Moreover, the present invention also relates to an ink-jet cartridge having any one of the above-mentioned ink-jet recording inks or a recording device that is provided with any one of the above-mentioned ink-jet recording inks, and discharges the ink onto a recording medium to carry out a recording process thereon. These arrangements also provide the same functions and effects as described above.

DETAILED DESCRIPTION OF THE INVENTION

Hereinafter, preferred embodiment of the present invention will be described with reference to the accompanying drawings.

(Embodiment 1)

Figure 1:
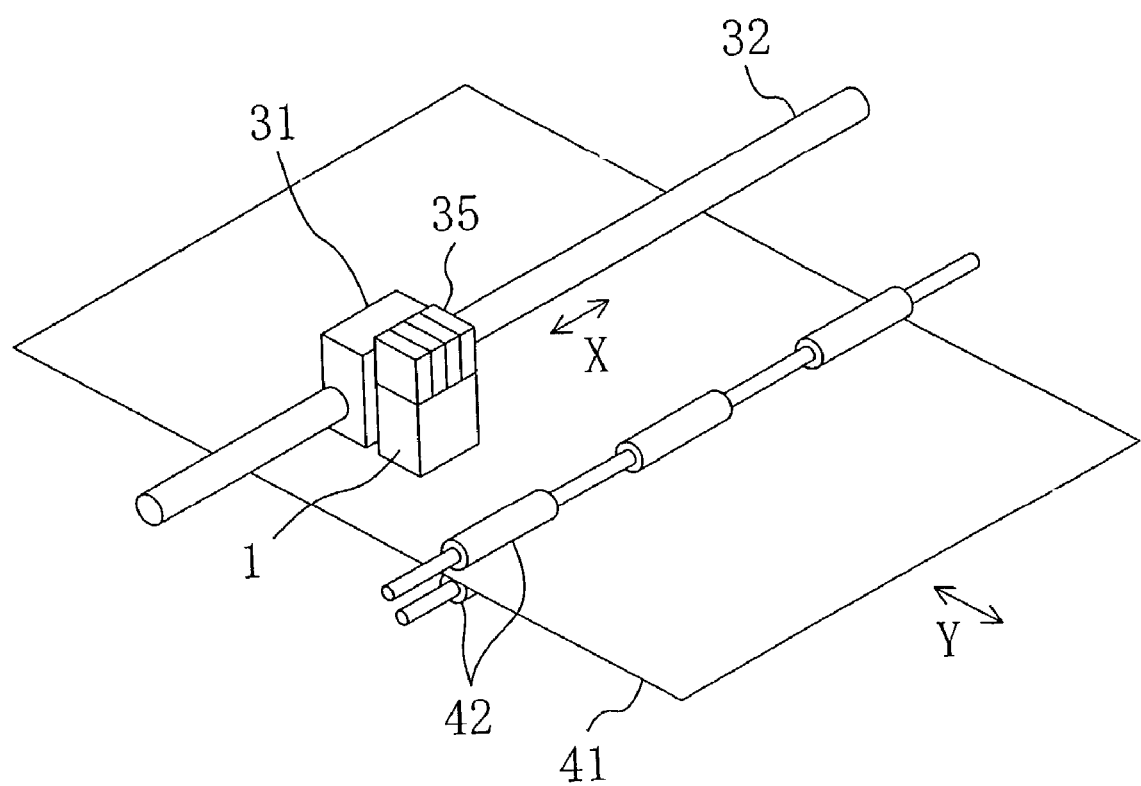
FIG. 1 is a schematic perspective view that shows an ink-jet-type recording device provided with an ink-jet recording ink in accordance with an embodiment of the present invention.

FIG. 1 is a schematic drawing that shows an ink-jet-type recording device provided with an ink-jet recording ink in accordance with embodiment 1 of the present invention. In this recording device, an ink cartridge 35 is provided with an ink-jet head 1 having the above-mentioned ink that is attached to the top face thereof, and this ink-jet head 1 discharges the ink onto recording paper 41 serving as a recording medium as will be described later. Moreover, the ink-jet head 1 is supported and secured onto a carriage 31, and this carriage 31 is supported by a carriage shaft 32 that extends in a main scanning direction (X-direction shown in FIGS. 1 and 2). Here, a carriage motor (not shown) is installed in the carriage 31, and this carriage motor allows the ink-jet head 1 and the carriage 31 to reciprocally move in the main scanning direction while being guided by the carriage shaft 32.

The above-mentioned recording paper 41 is sandwiched by two transporting rollers 42 that are driven to rotate by a transporting motor, not shown, and this transporting motor and the respective transporting rollers 42 transport the recording paper 41 transports the recording paper 41 in a sub-scanning direction (Y-direction shown in FIGS. 1 and 2) that is perpendicular to the above-mentioned main scanning direction below the ink-jet head 1. In this manner, the carriage 31, the carriage shaft 32 and the carriage motor as well as the respective transporting rollers 42 and the transporting motor transport the ink-jet head 1 and the recording paper 41 relatively to each other.

Figure 2:
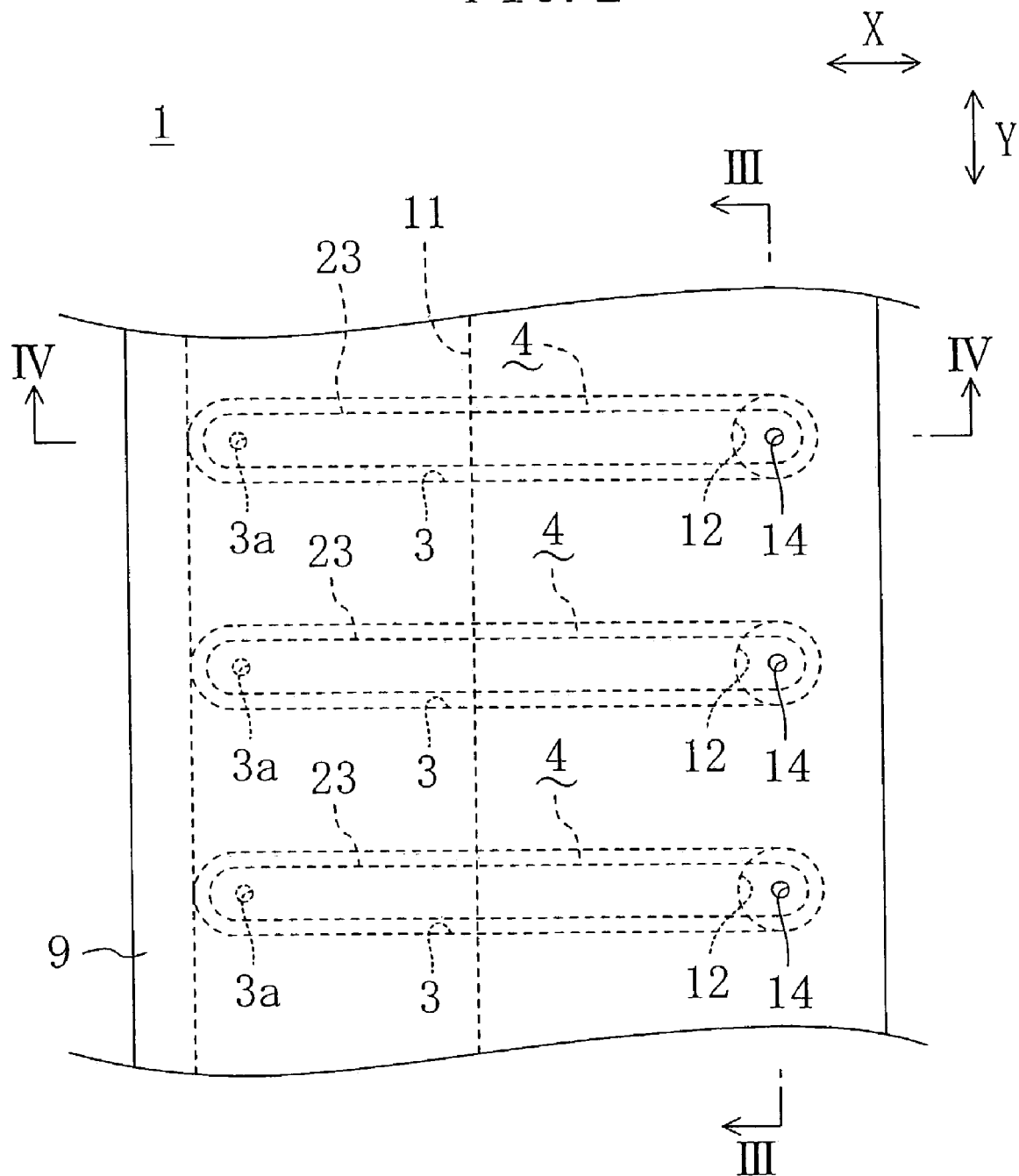
FIG. 2 is a partial bottom view of an ink-jet head of the ink-jet-type recording device.
Figure 3:
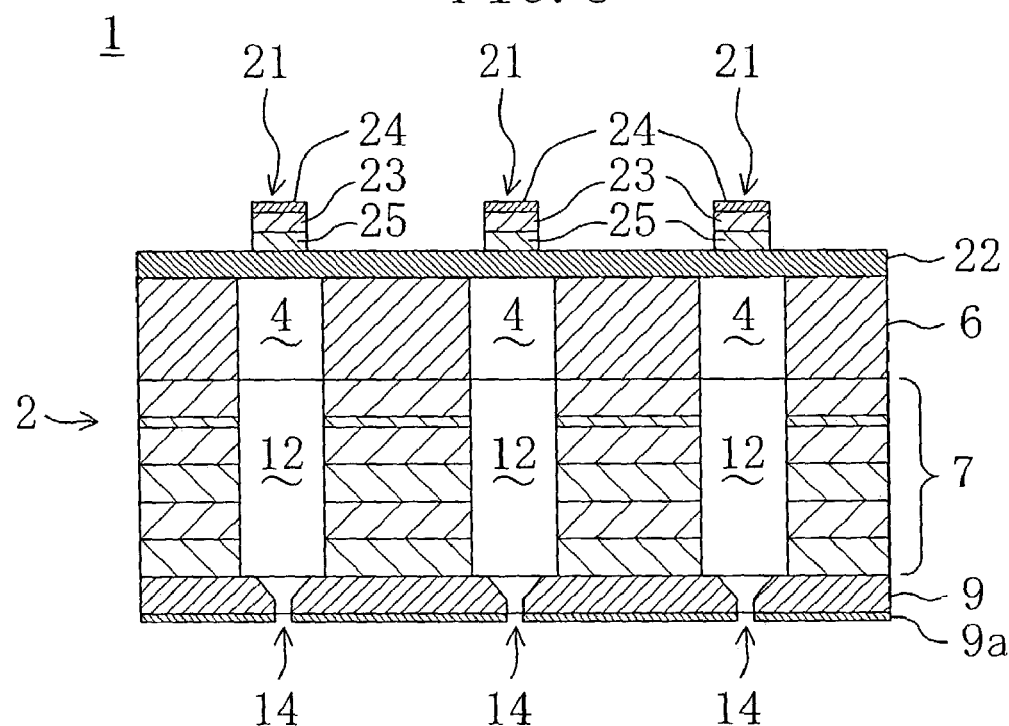
FIG. 3 is a cross-sectional view taken along line III—III of FIG. 2.
Figure 4:
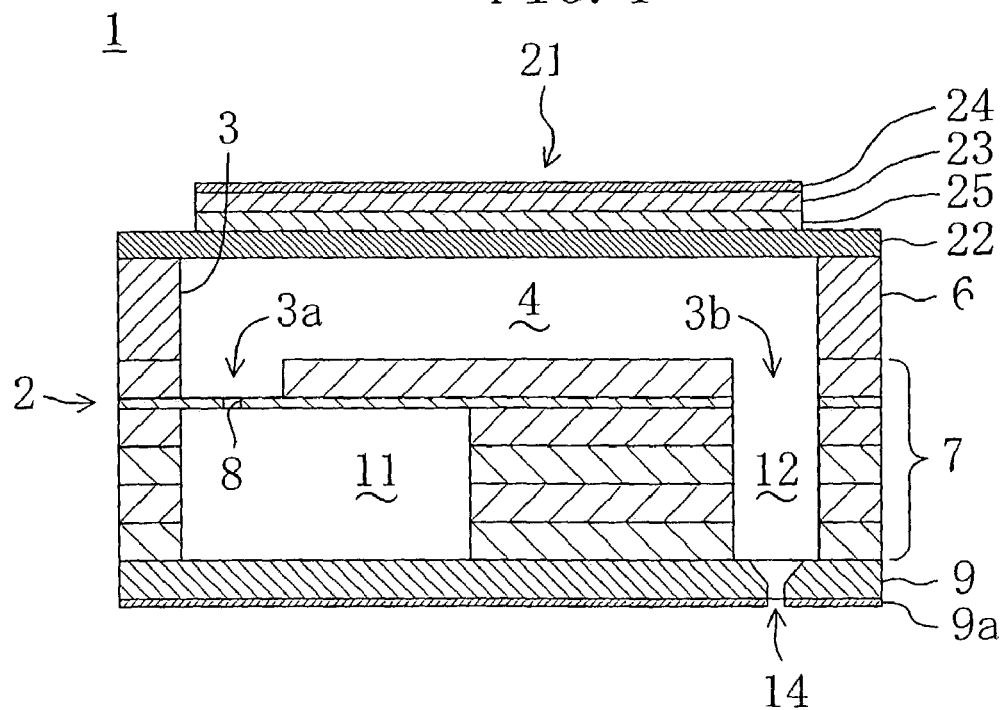
FIG. 4 is a cross-sectional view taken along line IV—IV of FIG. 2.

As shown in FIGS. 2 to 4, the above-mentioned ink-jet head 1 is provided with a head main body 2 in which a plurality of pressure-chamber-use recessed sections 3, each having a supply opening 3a for supplying ink and a discharge opening 3b for discharging ink, are formed. The respective recessed sections 3 of this head main body 2 have openings that are placed in a manner so as to extend on the top face of the head main body 2 in the above-mentioned main scanning direction; thus, the openings are aligned side by side with virtually the same intervals from each other in the above-mentioned sub-scanning direction. The total length of the openings of the above-mentioned recessed sections 3 is set to, for example, approximately 1250 μm with the width thereof being set to, for example, approximately 130 µm. Here, both of the end portions of the opening of each recessed section 3 have a virtually semi-circular shape.

The side wall portion of each recessed section 3 of the above-mentioned head main body 2 is formed by a pressure chamber part 6 made of photosensitive glass having a thickness of approximately 200 µm. The bottom wall portion of each recessed section 3 is formed by an ink passage part 7 that is made by laminating six sheets of stainless steel thin plates, and bonded and secured to the lower face of the pressure chamber part 6. In the ink passage part 7 are installed a plurality of orifices 8 that are respectively connected to the supply openings 3a of the above-mentioned respective recessed sections 3, and a supply-use ink passage 11 that is connected to the respective orifices 8 and extends in the above-mentioned sub-scanning direction, and a plurality of discharging ink passages 12 that are connected to the respective discharging openings 3b.

The respective orifices 8 are formed in a stainless steel thin plate that is placed on the second level from the top, and has a thickness smaller than the other plates in the ink passage part 7, and the diameter thereof is set to approximately 38 µm. Moreover, the supply-use ink passage 11 is connected to the above-mentioned ink cartridge 35 so that the ink cartridge 35 supplies the ink into the supply-use ink passage 11.

A nozzle plate 9, made of stainless steel, is bonded and secured to the lower face of the above-mentioned ink passage part 7, and the lower face of the nozzle plate 9 is coated with a water repellent film 9a. In the nozzle plate 9, a plurality of nozzles 14, used for discharging ink droplets onto the recording paper 41, are formed on the lower face of the ink-jet head 1 so as to be aligned in a row in the above-mentioned sub-scanning direction. The nozzles 14 are respectively connected to the discharging ink passages 12 so as to communicate with the discharge openings 3b of the respective recessed sections 3 through the discharging ink passages 12. Here, each of the nozzles 14 is constituted by a taper portion having a nozzle diameter that is narrowed toward the nozzle top side and a straight portion that is continuously formed on the nozzle top side of the taper portion, and the nozzle diameter of the straight portion is set to approximately 20 µm.

Piezoelectric actuators 21 are attached to upper sides of the respective recessed sections 3 of the above-mentioned main body 2. Each piezoelectric actuator 21 has a vibration plate 22, made of Cr, that covers each recessed section 3 of the head main body 2 while being bonded and secured to the upper face of the above-mentioned head main body 2 so as to form a pressure chamber 4 in cooperation with the recessed section 3. This vibration plate 22 is prepared as a single member commonly used for all the piezoelectric actuators 21, and also allowed to serve as a common electrode commonly used for all piezoelectric elements 23, which will be described later.

Moreover, each of the piezoelectric actuators 21 is provided with a piezoelectric element 23, made of lead zirconate titanate (PZT), that is placed on a portion (facing the opening of the recessed section 3) corresponding to the pressure chamber 4 on a side face (top face) opposite to the pressure chamber 4 of the above-mentioned vibration plate 22 through an intermediate layer 25 made of Cu, and an individual electrode 24, made of Pt, that is joined to the side face (top face) opposite to the above-mentioned vibration plate 22 of each piezoelectric element 23, and used for applying a voltage (driving voltage) to the respective piezoelectric elements 23 together with the vibration plate 22.

All the above-mentioned vibration plate 22, the respective piezoelectric elements 23, the respective individual electrodes 24 and the intermediate layers 25 are made of thin films; and the thickness of the vibration plate 22 is set to approximately 6 µm, the thickness of each piezoelectric element 23 is set to not more than 8 µm (for example, approximately 3 µm), the thickness of each individual electrode 24 is set to approximately 0.2 µm, and the thickness of each intermediate layer 25 is set to approximately 3 µm.

The above-mentioned piezoelectric actuators 21 apply a driving voltage to each piezoelectric element 23 through the vibration plate 22 and each individual electrode 24 so that the vibration plate 22 is deformed at portions (opening portions of the recessed sections 3) corresponding to the pressure chambers 4; thus, the ink, contained inside the pressure chamber 4, is discharged through the discharge openings 3b, that is, the nozzles 14. In other words, when a pulse-shaped voltage is applied between the vibration plate 22 and the individual electrodes 24, the piezoelectric element 23 is allowed to shrink in a width direction perpendicular to its thickness direction because of its piezoelectric effect upon receipt of a rise of the pulse voltage, while the vibration plate 22, the individual electrodes 24 and the intermediate layers 25 are not allowed to shrink; therefore, the portions of the vibration plate 22 corresponding to the pressure chambers 4 are deformed to be distorted in a convex shape toward the pressure chamber 4 side, due to a so-called bimetal effect. This elastic deformation increases the pressure inside the pressure chamber 4 so that this pressure pushes out the ink inside the pressure chamber 4 from the nozzles 14 through the discharge openings 3b and discharge-use ink passages 12. Then, upon receipt of the fall of the above-mentioned pulse voltage, the piezoelectric element 23 is allowed to extend so that the portions of the vibration plate 22 corresponding to the pressure chambers 4 are returned to the original state, and at this time, the ink that is being pushed through the nozzle 14 is cut off from ink located inside the ink passage 12, and discharged onto the recording paper 41 as ink droplets (for example, 3 pl) to be allowed to adhere to the surface of the recording paper 41 in a dot format. Moreover, when the above-mentioned vibration plate 22 is returned to its original state from the deformed state distorted into a convex shape, the pressure chambers 4 are filled with ink that is supplied from the above-mentioned ink cartridge 35 through the supply-use ink passages 11 and the supply openings 3a.

Here, with respect to the pulse voltage to be applied to each piezoelectric element 23, not limited to the above-mentioned push and pull type, that of the pull and push type, in which, after having dropped from a first voltage to a second voltage that is lower than the first voltage, the voltage is allowed to rise to the first voltage, may be used.

The application of the driving voltage to the respective piezoelectric elements 23 is carried out every predetermined period of time (for example, approximately 50 µs: driving frequency 20 kHz) when the ink-jet head 1 and the carriage 31 are being shifted in the main scanning direction from one end to the other end of the recording paper 41 at a virtually constant speed (however, when the ink-jet head 1 has reached a portion of the recording paper 41 to which the ink droplet is not applied, the voltage is no longer applied). Thus, the ink droplet is put at a predetermined position of the recording paper 41. Upon completion of the recording process corresponding to one scanning process, the recording paper 41 is transported in the sub-scanning direction by a predetermined amount by the transporting motor and the transporting rollers 42, and while the ink-jet head 1 and the carriage 31 are again being shifted in the main scanning direction, the ink droplets are discharged so as to carry out a recording process corresponding to a new scanning process. By repeating these operations, a desired image is formed on the entire surface of the recording paper 41.

The ink to be used in the above-mentioned recording device contains a water soluble dye (or may be an organic pigment) serving as a color material, a moisture-retaining agent to suppress drying in a nozzle 14 or the like of the above-mentioned ink-jet head 1, a penetrating agent for improving the permeability of the ink (solvent) to the recording paper 41, water, a hydrolytic silane compound (organic silicon compound) serving as a water soluble substance to be subjected to a condensation polymerizing reaction without water and an ultraviolet-ray absorbing agent.

The above-mentioned silane compound is subjected to a condensation polymerizing reaction on the recording paper 41 when, after the ink droplets, discharged from the nozzle 14 of the ink-jet head 1, have adhered to the recording paper 41, moisture (solvent) evaporates or permeates into the recording paper 41, and allowed to surround the dye so that, even when an image on the recording paper 41 gets wet with water, it is possible to prevent the dye from oozing into water, and consequently to improve the water-resisting property of the image. The compound is preferably prepared as a hydrolytic reactant between alkoxy silane containing an organic group having an amino group and alkoxy silane containing no amino group, or an organic silicon compound that is obtained by hydrolyzing hydrolytic silane obtained by allowing an organic mono-epoxy compound to react with hydrolytic silane containing an amino group and hydrolytic silane containing no nitrogen atoms.

Any dye may be used as the above-mentioned dye; however, a water soluble acidic dye or a direct dye is preferably used. With respect to the above-mentioned moisture-retaining agent, polyhydric alcohols such as glycerin, or water soluble nitrogen heterocyclic compounds, such as 2-pyrrolidone and N-methyl-2-pyrrolidone, are used.

With respect to the above-mentioned penetrating agent, mono-alkyl ethers of polyhydric alcohols, such as diethylene glycol mono-butyl ether, are preferably used. Here, the penetrating agent is not necessarily required, and may be omitted on demand.

With respect to the above-mentioned ultraviolet-ray absorbing agent, benzophenone-based, benzotriazole-based, cyano-acrylate-based and oxalic acid anilide-based compounds may be used. Moreover, the relationship between concentrations of the ultraviolet-ray absorbing agent and the silane compound (organic silicon compound) is set so that a silane compound in a range of 0.1 parts by weight to 50 parts by weight and an ultraviolet-ray absorbing agent in a range of 0.1 parts by weight to 10 parts by weight are contained, with respect to 100 parts by weight of the ink.

The concentration of the silane compound serving as the above-mentioned organic silicon compound of less than 0.1 parts by weight causes a reduction in the water resisting effect, failing to obtain sufficient effects. In contrast, the concentration thereof exceeding 50 parts by weight not only makes the water resisting effect reach a saturated state, but also causes a reduction in the optical concentration and degradation in the color stability. Therefore, the concentration of the silane compound is set in a range of 0.1 parts by weight to 50 parts by weight.

Moreover, the concentration of the above-mentioned ultraviolet-ray absorbing agent of less than 0.1 parts by weight makes it difficult to suppress a reduction in the concentration of the color material due to light irradiation, failing to obtain sufficient results. In contrast, the concentration of the above-mentioned ultraviolet-ray absorbing agent exceeding 10 parts by weight not only makes the suppressing effect on the reduction in the color material concentration reach a saturated state, but also causes degradation in the color stability. Therefore, the concentration of the ultraviolet-ray absorbing agent is set in a range of 0.1 parts by weight to 10 parts by weight.

Therefore, in the above-mentioned embodiment 1, since the silane compound serving as the organic silicon compound for improving the water-resisting property is contained, it is possible to improve the water-resisting property of an image formed by the ink on the recording paper 41. Moreover, since the ultraviolet-ray absorbingagent is contained in the ink by a predetermined concentration so that, even when upon application of ultraviolet rays, an amino group ($-NH_2$) contained in the silicon compound tries to attack an azo group ($-N=N-$) of the color material, the light energy of the ultraviolet rays is converted to kinetic energy, heat energy and the like by the ultraviolet-ray absorbing agent having a predetermined concentratin, thereby making it possible to suppress deterioration in the color material and consequently to prevent degradation in the light-resisting property. The synergistic action of these makes it possible to achieve both of the water-resisting and light-resisting properties of the ink.

Next, the following description will discuss examples that were actually carried out. First, fourteen kinds of ink-jet recording inks having the following compositions (the content of each composition is indicated by mass percentage) (Examples 1-1 to 1-14) were prepared.

In all the examples 1-1 to 1-14, glycerin was contained as the moisture-retaining agent. Moreover, with respect to the dye (color material), acid yellow 23 was contained. Moreover, with respect to the water soluble substance to be subjected to a condensation polymerizing reaction without water, an organic silicon compound (A) was contained. This organic silicon compound (A) was prepared by using the following method.

In other words, to a reaction container provided with a stirrer and a thermometer 120 g (6.67 moles) of water was put, and to this water was added a mixture of 0.2 moles of $H_2NCH_2CH_2HNCH_2CH_2CH_2Si(OCH_3)_3$ and 0.1 moles of $Si(OCH_3)_4$ drop by drop at room temperature, and stirred and mixed; thus, after all the amount thereof had been dropped, this was allowed to react for 2 hours at 60° C. to 75° C. to obtain the organic silicon compound (A).

Figure 5:
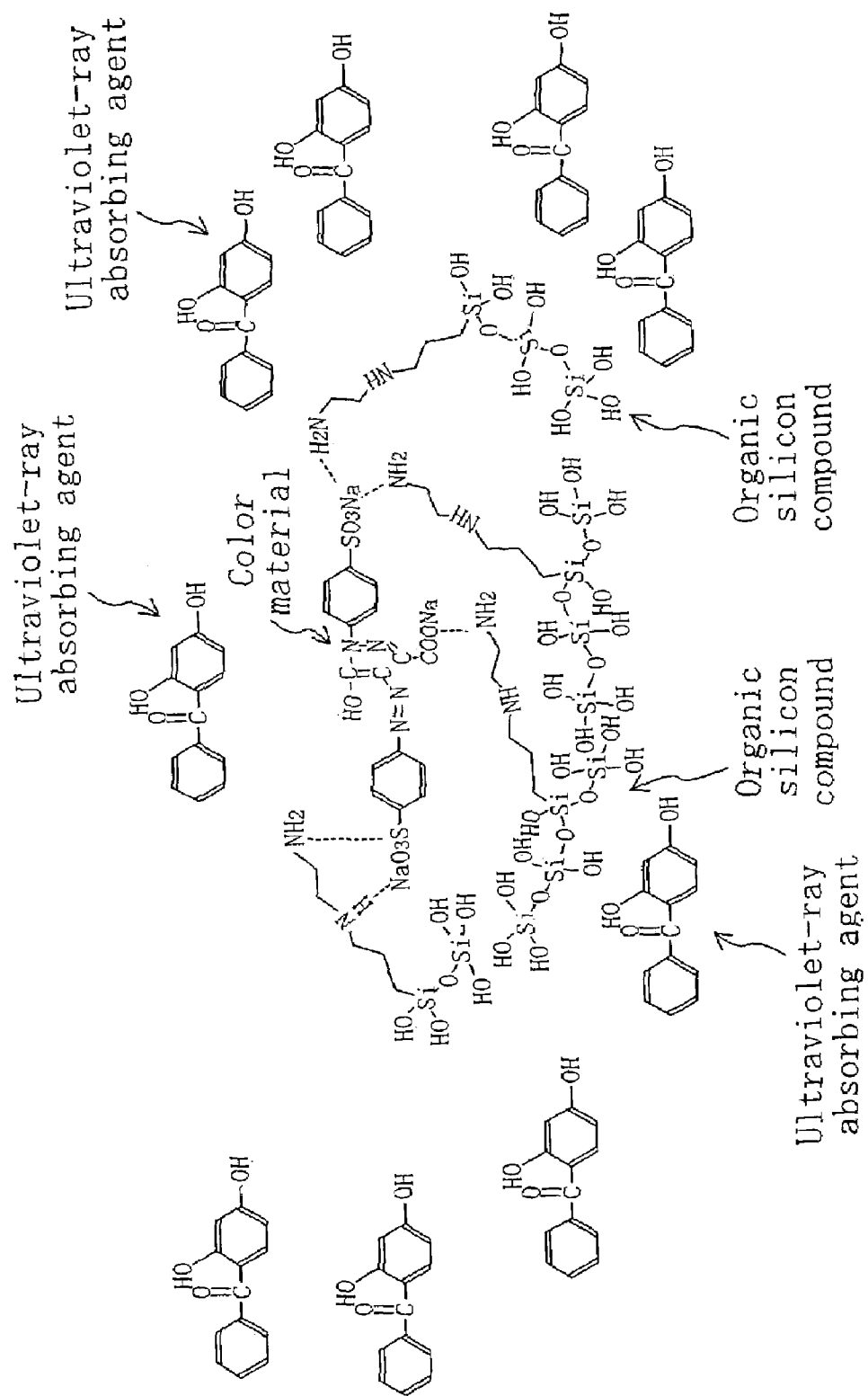
FIG. 5 is a drawing that shows the relationship among a color material, an organic silicon compound and an ultraviolet-ray absorbing agent contained in an ink in accordance with embodiment 1.

In Example 1-1, 2,4-Dihydroxy benzophenone was added to an ink having a water-resisting property as the ultraviolet-ray absorbing agent, and the resulting composition is shown below, and FIG. 5 shows the relationship among the color material, the organic silicon compound and 2,4-Dihydroxy benzophenone (ultraviolet-ray absorbing agent).

EXAMPLE 1-1

| | |
|---|---|
| Acid yellow 23 | 5% |
| Glycerin | 10% |
| Organic silicon compound (A) | 5% |
| 2,4-Dihydroxy benzophenone | 1% |
| Pure water | 79% |

EXAMPLE 1-2

In the above-mentioned Example 1-1, 2,4-Dihydroxy benzophenone was replaced by 2-Hydroxy-4-methoxy-benzophenone-5-sulfonic acid serving as the same benzophenone-based ultraviolet-ray absorbing agent.

EXAMPLE 1-3

In the above-mentioned Example 1-1, 2,4-Dihydroxy benzophenone was replaced by Bis(5-benzoyl-4-hydroxy-2-methoxyphenyl)methane serving as the same benzophenone-based ultraviolet-ray absorbing agent.

EXAMPLE 1-4

In the above-mentioned Example 1-1, 2,4-Dihydroxy benzophenone was replaced by 2,2'-Dihydroxy-4,4'-dimethoxy benzophenone serving as the same benzophenone-based ultraviolet-ray absorbing agent.

EXAMPLE 1-5

In the above-mentioned Example 1-1, 2,4-Dihydroxy benzophenone was replaced by 2-(2'-Hydroxy-5'-methylphenyl)benzotriazole serving as a benzotriazole-based ultraviolet-ray absorbing agent.

EXAMPLE 1-6

In the above-mentioned Example 1-1, 2,4-Dihydroxy benzophenone was replaced by 2-[2'-Hydroxy-3',5'-bis($\alpha,\alpha$-dimethyl benzyl)phenyl]-benzotriazole serving as a benzotriazole-based ultraviolet-ray absorbing agent.

EXAMPLE 1-7

In the above-mentioned Example 1-1, 2,4-Dihydroxy benzophenone was replaced by 2-(2'-Hydroxy-3',5'-di-t-butyl-phenyl)-benzotriazole serving as a benzotriazole-based ultraviolet-ray absorbing agent.

EXAMPLE 1-8

In the above-mentioned Example 1-1, 2,4-Dihydroxy benzophenone was replaced by 2-(2'-Hydroxy-3'-tert-butyl-5'-methylphenyl)-5-chlorobenzotriazole serving as a benzotriazole-based ultraviolet-ray absorbing agent.

EXAMPLE 1-9

In the above-mentioned Example 1-1, 2,4-Dihydroxy benzophenone was replaced by 2-(2'-Hydroxy-3',5'-di-tert-butyl-phenyl)-5-chlorobenzotriazole serving as a benzotriazole-based ultraviolet-ray absorbing agent.

EXAMPLE 1-10

In the above-mentioned Example 1-1, 2,4-Dihydroxy benzophenone was replaced by 2-(2'-Hydroxy-5'-t-octylphenyl)-benzotriazole serving as a benzotriazole-based ultraviolet-ray absorbing agent.

EXAMPLE 1-11

In the above-mentioned Example 1-1, 2,4-Dihydroxy benzophenone was replaced by 2-(2'-Methylene-bis-[4-(1,1,3,3-tetramethylbutyl)-6-(2N-benzotriazole-2-yl)phenol] serving as a benzotriazole-based ultraviolet-ray absorbing agent.

EXAMPLE 1-12

In the above-mentioned Example 1-1, 2,4-Dihydroxy benzophenone was replaced by Ethyl-2-cyano-3,3'-diphenyl acrylate serving as an acrylate-based ultraviolet-ray absorbing agent.

EXAMPLE 1-13

In the above-mentioned Example 1-1, 2,4-Dihydroxy benzophenone was replaced by 2-Ethyl-hexyl-2-cyano-3,3'-diphenyl acrylate serving as an cyanoacrylate-based ultraviolet-ray absorbing agent.

EXAMPLE 1-14

In the above-mentioned Example 1-1, 2,4-Dihydroxy benzophenone was replaced by 2-Ethoxy-2'-ethyl oxalic acid bisanilide serving as a oxalic acid anilide-based ultraviolet-ray absorbing agent.

Here, for comparative purposes, two kinds of inks having the following compositions (contents of the respective compositions are indicated by mass percentage)(Comparative Example 1-1 and Comparative Example 1-2) were prepared. In other words, Comparative Example 1-1 prepared a general dye ink that was not subjected to a waterproof treatment, without an organic silicon compound for improving the waterproof added thereto.

Moreover, Comparative Example 1-2 was a conventional waterproof ink containing the above-mentioned organic silicon compound (A). The organic silicon compound (A) was prepared by using the following method: To a reaction container 120 g (6.67 moles) of water was loaded, and to this water was added a mixture of 0.2 moles of $H_2NCH_2CH_2HNCH_2CH_2CH_2Si(OCH_3)_3$ and 0.1 moles of $Si(OCH_3)_4$ drop by drop at room temperature, and stirred and mixed; thus, after all the amount thereof had been dropped, this was allowed to react for 1 hour at 60° C. to obtain the organic silicon compound (A).

COMPARATIVE EXAMPLE 1-1

| | |
|---|---|
| Acid yellow 23 | 5% |
| Glycerin | 10% |
| Pure water | 85% |

COMPARATIVE EXAMPLE 1-2

| | |
|---|---|
| Acid yellow 23 | 5% |
| Glycerin | 10% |
| Organic silicon compound (A) | 5% |
| Pure water | 80% |

Then, water-resisting property tests and light-resisting property tests were carried out on the respective inks of Example 1-1 as a typical example among the above-mentioned Examples 1-1 to 1-14, Comparative Example 1-1 and Comparative Example 1-2. In these two types of tests, an image was formed on plain paper (trade name "Xerox 4024": made by Xerox Corporation) with the respective inks by using a commercial printer (in which ink was discharged by a piezoelectric actuator similar to that of the above-mentioned embodiment 1 (however, the thickness of the piezoelectric element was much greater than that of the above-mentioned embodiment 1)), and immediately after the image had been formed, the paper was immersed in pure water, and then left at room temperature to be dried. Further, in the water-resisting property tests, the optical concentration retaining rate of the paper was examined. In the light-resisting property tests, the above-mentioned paper was subjected to light irradiation for 48 hours by a Sunshine Weather Meter provided with a carbon arc lamp, and the optical concentration retaining rate was then examined. Table 1 shows the results of these tests.

TABLE 1

| | | Water-resisting property Optical concentration retaining rate (%) | Light-resisting property Optical concentration retaining rate (%) |
|---|---|---|---|
| Example | 1-1 | 99 | 80 |
| Comparative | 1-1 | 75 | 80 |
| Example | 1-2 | 99 | 70 |

The results of Table 1 show that the ink of Example 1-1 has the same water-resisting property as the ink of Comparative Example 1-2 that contains an organic silicon compound, and also has the same light-resisting property as the ink of Comparative Example 1-1 that has not been subjected to a waterproof treatment; thus, it is confirmed that not only the water-resisting property but also the light-resisting property is improved. Therefore, it has been confirmed that the present invention makes it possible to improve both of the light-resisting property and water-resisting property of the ink-jet recording ink.

Even when the ratio of 2,4-Dihydroxy benzophenone in Example 1-1 was reduced to 0.1%, the optical concentration retaining rate was 72% upon evaluation of the light-resisting property so that the improvement in the light-resisting property was confirmed in the case of not less than 0.1% of the ultraviolet-ray absorbing agent.

Moreover, in all the Examples 1-1 to 1-14, Diethylene glycol monobutyl ether (DEGMBE) may be added thereto as a penetrating agent. In this case, an example of the synthesized ink corresponding to Example 1-1 is shown below:

(Example of Synthesized Ink)

| | |
|---|---|
| Acid yellow 23 | 5% |
| Glycerin | 10% |
| DEGMBE | 10% |
| Organic silicon compound (A) | 5% |
| 2,4-Dihydroxy benzophenone | 1% |
| Pure water | 69% |

(Embodiment 2)

In this embodiment 2, the same recording device (see FIGS. 1 to 4) as the above-mentioned embodiment 1 was used, and only the inks to be used therein were different. In other words, in the present embodiment 2, the ink contains a water soluble dye (or may be an organic pigment) serving as a color material, a moisture-retaining agent for suppressing drying in a nozzle 14 or the like of the above-mentioned ink-jet head 1, a penetrating agent for improving the permeability of the ink (solvent) to the recording paper 41, water and a hydrolytic silane compound (organic silicon compound) serving as a water soluble substance to be subjected to a condensation polymerizing reaction without water.

In the same manner as embodiment 1, the above-mentioned silane compound is subjected to a condensation polymerizing reaction on the above-mentioned recording paper 41 when, after the ink droplets, discharged from the nozzle 14 of the ink-jet head 1, have adhered to the recording paper 41, moisture (solvent) evaporates or permeates into the recording paper 41, and allowed to surround the dye so that, even when an image on the recording paper 41 gets wet with water, it is possible to prevent the dye from oozing into water, and consequently to improve the water-resisting property of the image. The compound is preferably prepared as a hydrolytic reactant between alkoxy silane containing an organic group having an amino group and alkoxy silane containing no amino group, or an organic silicon compound that is obtained by hydrolyzing hydrolytic silane obtained by allowing an organic mono-epoxy compound to react with hydrolytic silane containing an amino group and hydrolytic silane containing no nitrogen atoms.

In the same manner as the above-mentioned embodiment 1, any dye may be used as the above-mentioned dye; however, a water soluble acidic dye or a direct dye is preferably used. With respect to the above-mentioned moisture-retaining agent, polyhydric alcohols such as glycerin, or water soluble nitrogen heterocyclic compounds, such as 2-pyrrolidone and N-methyl-2-pyrrolidone, are preferably used.

With respect to the above-mentioned penetrating agent, mono-alkyl ethers of polyhydric alcohols, such as diethylene glycol mono-butyl ether, are preferably used. Here, the penetrating agent is not necessarily required, and may be omitted on demand. Further, the hydrolytic silane compound serving as the above-mentioned organic silicon compound has an ultraviolet-ray absorbing part (ultraviolet-ray absorbing group). This ultraviolet-ray absorbing part is prepared as at least one functional group selected from the group consisting of benzophenone-based, benzotriazole-based, cyanoacrylate-based and oxalic acid anilide-based functional groups.

Moreover, the concentration of the hydrolytic silane compound having the above-mentioned ultraviolet-ray absorbing part is set to 0.1 parts by weight to 50 parts by weight with respect to 100 parts by weight of the ink.

Here, when the hydrolytic silane compound containing the ultraviolet-ray absorbing part has a concentration of less than 0.1 parts by weight, the synergistic effect of the water-resisting and light-resisting properties is reduced, failing to provide a sufficient effect. In contrast, the concentration thereof exceeding 50 parts by weight not only makes the synergistic effect of the water resisting and light resisting properties reach a saturated state, but also causes a reduction in the optical concentration and degradation in the color stability. Therefore, the concentration of the hydrolytic silane compound is preferably set in a range of 0.1 parts by weight to 50 parts by weight.

Thus, in the present embodiment 2, since the hydrolytic silane compound is contained in the ink as the organic silicon compound for improving the water-resisting property, it is possible to improve the water-resisting property of an image on the recording paper 41 by the ink. Furthermore, since the above-mentioned hydrolytic silane compound has the ultraviolet-ray absorbing part so that, even when upon application of ultraviolet rays, an amino group ($-NH_2$) contained in the hydrolytic silane compound tries to attack an azo group ($-N=N-$) of the color material, the light energy of the ultraviolet rays is converted to kinetic energy, heat energy and the like by the ultraviolet-ray absorbing part, thereby making it possible to suppress deterioration in the color material and consequently to prevent degradation in the light-resisting property. Here, since the color material is coated with the light-resisting silane compound so as to be protected from light energy, the light-resisting property can be improved in comparison with not only the case of the application of only the color material but also the case of the addition of an ultraviolet-ray absorbing agent to the waterproof ink; thus, this synergistic function makes it possible to achieve improvements in both of the ink water-resisting property and light-resisting property.

Next, the following description will discuss examples that were actually carried out. First, fourteen kinds of ink-jet recording inks having the following compositions (the content of each composition is indicated by mass percentage) were prepared (Examples 2-1 to 2-14).

In all the Examples 2-1 to examples 2-14, glycerin was contained as the moisture-retaining agent. Moreover, with respect to the dye (color material), acid yellow 23 was contained. Moreover, with respect to the water soluble substance to be subjected to a condensation polymerizing reaction without water, an organic silicon compound (B) was contained. This organic silicon compound (B) was prepared by using the following method.

In other words, to a reaction container provided with a stirrer and a thermometer 120 g (6.67 moles) of water was put, and to this water was added a mixture of 0.2 moles of $H_2NCH_2CH_2HNCH_2CH_2CH_2Si(OCH_3)_3$, 0.1 moles of $Si(OCH_3)_4$ and 0.02 moles of 2,4-Dihydroxy benzophenone serving as a benzophenone-based ultraviolet-ray absorbing agent drop by drop at room temperature, and stirred and mixed; thus, after all the amount thereof had been dropped, this was allowed to react for 2 hours at 60° C. to 75° C. to obtain the organic silicon compound (B).

Figure 6:
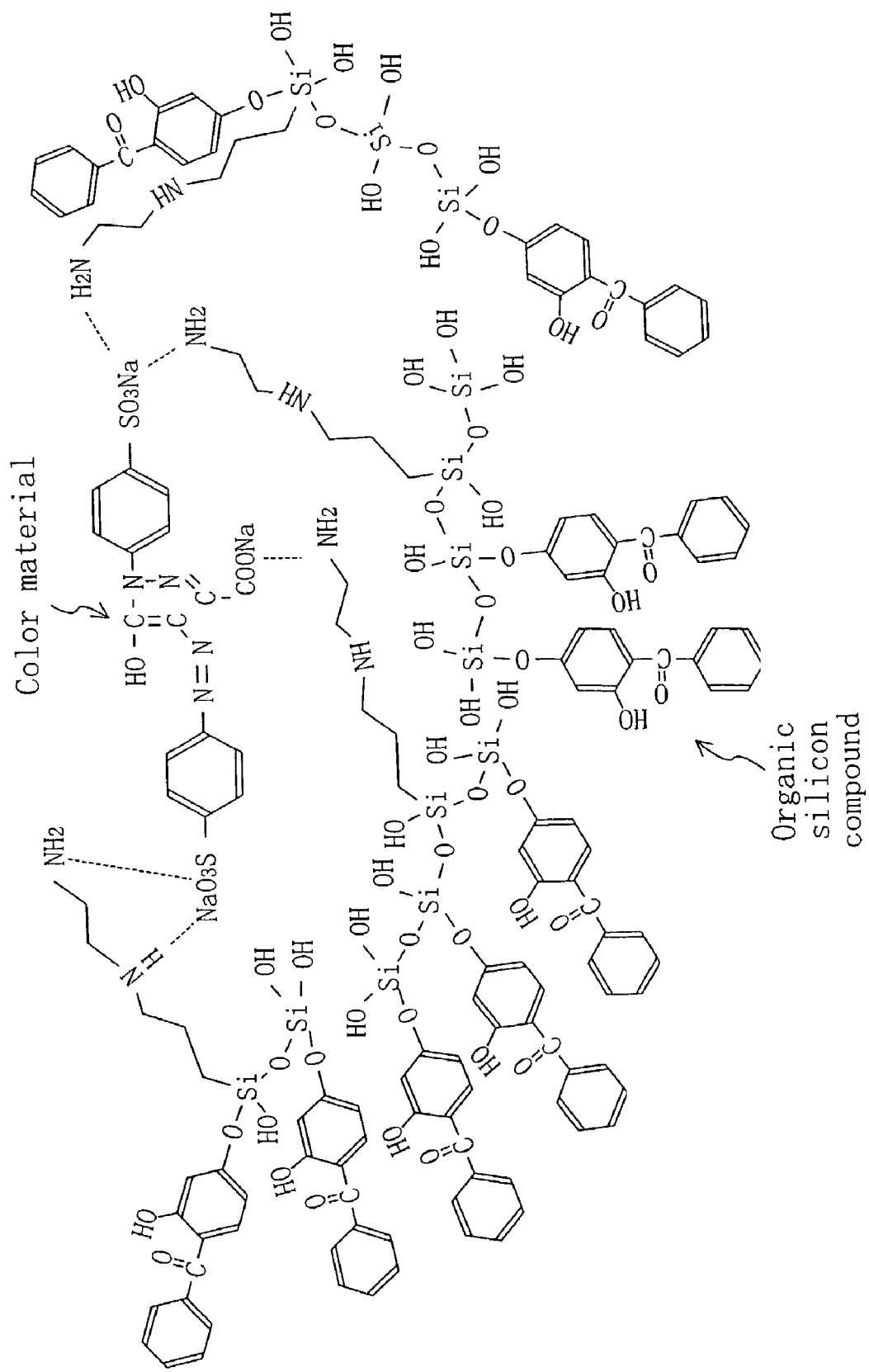
FIG. 6 is a drawing that shows the relationship among a color material, an organic silicon compound and an ultraviolet-ray absorbing agent contained in an ink in accordance with embodiment 2.
Figure 7:
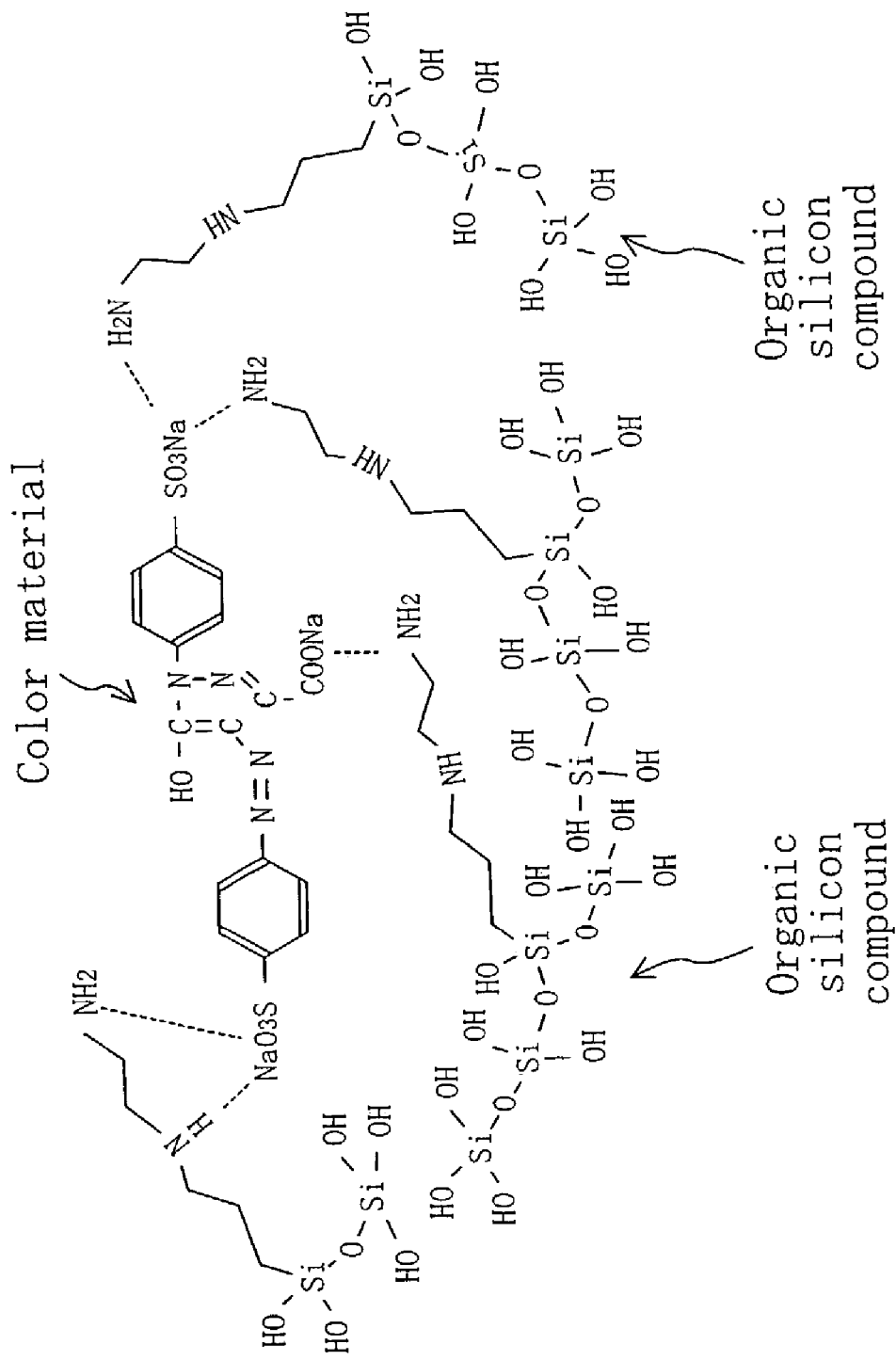
FIG. 7 is a drawing that shows the relationship between a color material and an organic silicon compound contained in a conventional ink, which corresponds to FIG. 5.
Figure 8A:
FIG. 8 is a drawing that shows a change and a cleavage from a double bond to a single bond of an azo group in the color material.
Figure 8B:

In Example 2-1, an ink having the following composition was prepared. Moreover, FIG. 6 shows the relationship between the color material and the organic silicon compound having the ultraviolet-ray absorbing part contained in the ink.

EXAMPLE 2-1

| | |
|---|---|
| Acid yellow 23 | 5% |
| Glycerin | 10% |
| Organic silicon compound (B) | 5% |
| Pure water | 80% |

EXAMPLE 2-2

In the above-mentioned Example 2-1, upon preparing the organic silicon compound (B), 2,4-Dihydroxy benzophenone was replaced by 2-Hydroxy-4-methoxy-benzophenone-5-sulfonic acid serving as the same benzophenone-based ultraviolet-ray absorbing agent to produce the organic silicon compound (B), and an ink was prepared.

EXAMPLE 2-3

In the above-mentioned Example 2-1, upon preparing the organic silicon compound (B), 2,4-Dihydroxy benzophenone was replaced by Bis(5-benzoyl-4-hydroxy-2-methoxyphenyl)methane serving as the same benzophenone-based ultraviolet-ray absorbing agent to produce the organic silicon compound (B), and an ink was prepared.

EXAMPLE 2-4

In the above-mentioned Example 2-1, upon preparing the organic silicon compound (B), 2,4-Dihydroxy benzophenone was replaced by 2,2'-Dihydroxy-4,4'-dimethoxy benzophenone serving as the same benzophenone-based ultraviolet-ray absorbing agent to produce the organic silicon compound (B), and an ink was prepared.

EXAMPLE 2-5

In the above-mentioned Example 2-1, upon preparing the organic silicon compound (B), 2,4-Dihydroxy benzophenone was replaced by 2-(2'-Hydroxy-5'-methylphenyl)benzotriazole serving as a benzotriazole-based ultraviolet-ray absorbing agent to produce the organic silicon compound (B), and an ink was prepared.

EXAMPLE 2-6

In the above-mentioned Example 2-1, upon preparing the organic silicon compound (B), 2,4-Dihydroxy benzophenone was replaced by 2-[2'-Hydroxy-3',5'-bis($\alpha,\alpha$-dimethylbenzyl)phenyl]-benzotriazole serving as a benzotriazole-based ultraviolet-ray absorbing agent to produce the organic silicon compound (B), and an ink was prepared.

EXAMPLE 2-7

In the above-mentioned Example 2-1, upon preparing the organic silicon compound (B), 2,4-Dihydroxy benzophenone was replaced by 2-(2'-Hydroxy-3',5'-di-t-butyl-phenyl)-benzotriazole serving as a benzotriazole-based ultraviolet-ray absorbing agent to produce the organic silicon compound (B), and an ink was prepared.

EXAMPLE 2-8

In the above-mentioned Example 2-1, upon preparing the organic silicon compound (B), 2,4-Dihydroxy benzophenone was replaced by 2-(2'-Hydroxy-3'-tert-butyl-5'-methylphenyl)-5-chlorobenzotriazole serving as a benzotriazole-based ultraviolet-ray absorbing agent to produce the organic silicon compound (B), and an ink was prepared.

EXAMPLE 2-9

In the above-mentioned Example 2-1, upon preparing the organic silicon compound (B), 2,4-Dihydroxy benzophenone was replaced by 2-(2'-Hydroxy-3',5'-di-tert-butyl-phenyl)-5-chlorobenzotriazole serving as a benzotriazole-based ultraviolet-ray absorbing agent to produce the organic silicon compound (B), and an ink was prepared.

EXAMPLE 2-10

In the above-mentioned Example 2-1, upon preparing the organic silicon compound (B), 2,4-Dihydroxy benzophenone was replaced by 2-(2'-Hydroxy-5'-t-octylphenyl)-benzotriazole serving as a benzotriazole-based ultraviolet-ray absorbing agent to produce the organic silicon compound (B), and an ink was perpared.

EXAMPLE 2-11

In the above-mentioned Example 2-1, upon preparing the organic silicon compound (B), 2,4-Dihydroxy benzophenone was replaced by 2-(2'-Methylene-bis[4-(1,1,3,3-tetramethylbutyl)-6-(2N-benzotriazole-2-yl) phenol] serving as a benzotriazole-based ultraviolet-ray absorbing agent to produce the organic silicon compound (B), and an ink was prepared.

EXAMPLE 2-12

In the above-mentioned Example 2-1, upon preparing the organic silicon compound (B), 2,4-Dihydroxy benzophenone was replaced by Ethyl-2-cyano-3,3'-diphenyl acrylate serving as cyanoacrylate-based ultraviolet-ray absorbing agent to produce the organic silicon compound (B), and an ink was prepared.

EXAMPLE 2-13

In the above-mentioned Example 2-1, upon preparing the organic silicon compound (B), 2,4-Dihydroxy benzophenone was replaced by 2-Ethylhexyl-2-cyano-3,3'-diphenyl acrylate serving as an cyanoacrylate-based ultraviolet-ray absorbing agent to produce the organic silicon compound (B), and an ink was prepared.

EXAMPLE 2-14

In the above-mentioned Example 2-1, upon preparing the organic silicon compound (B), 2,4-Dihydroxy benzophenone was replaced by 2-Ethoxy-2'-ethyl oxalic acid bisanilide serving as a oxalic acid anilide-based ultraviolet-ray absorbing agent to produce the organic silicon compound (B), and an ink was prepared.

Here, for comparative purposes, two kinds of inks having the following compositions (contents of the respective compositions are indicated by mass percentage) were prepared (Comparative Example 2-1 and Comparative Example 2-2). In other words, Comparative Example 2-1 prepared a general dye ink that was not subjected to a waterproof treatment, without an organic silicon compound for improving the waterproof added thereto.

Meanwhile, Comparative Example 2-2 was a conventional waterproof ink containing the organic silicon compound (A). The organic silicon compound (A) was prepared by using the following method: To a reaction container 120 g (6.67 moles) of water was put, and to this water was added a mixture of 0.2 moles of $H_2NCH_2CH_2HNCH_2CH_2CH_2Si(OCH_3)_3$ and 0.1 moles of $Si(OCH_3)_4$ drop by drop at room temperature, and stirred; thus, after all the amount thereof had been dropped, this was allowed to react for 1 hour at 60° C. to obtain the organic silicon compound (A).

COMPARATIVE EXAMPLE 2-1

| Acid yellow 23 | 5% |
| Glycerin | 10% |
| Pure water | 85% |

COMPARATIVE EXAMPLE 2-2

| Acid yellow 23 | 5% |
| Glycerin | 10% |
| Organic silicon compound (A) | 5% |
| Pure water | 80% |

Then, water-resisting property tests and light-resisting property tests were carried out on the respective inks of Example 2-1 as a typical example among the above-mentioned Examples 2-1 to 2-14, Comparative Example 2-1 and Comparative Example 2-2. In these two types of tests, an image was formed on plain paper (trade name "Xerox 4024": made by Xerox Corporation) with the respective inks by using the above-mentioned commercial printer, and immediately after the image had been formed, the paper was immersed in pure water, and then left at room temperature to be dried. Further, in the water-resisting property tests, the optical concentration retaining rate of the paper was examined. In the light-resisting property tests, the above-mentioned paper was subjected to light irradiation for 48 hours by a Sunshine Weather Meter provided with a carbon arc lamp, and the optical concentration retaining rate was then examined. Table 2 shows the results of these tests.

TABLE 2

| | | Water-resisting property Optical concentration retaining rate (%) | Light-resisting property Optical concentration retaining rate (%) |
|---|---|---|---|
| Example 2-1 | | 99 | 90 |
| Comparative | 2-1 | 75 | 80 |
| Example | 2-2 | 99 | 70 |

The results in Table 2 show that the ink of Example 2-1 has the same water-resisting property as the ink of Comparative Example 2-2 that contains an organic silicon compound, and also has a light-resisting property higher than that of the ink of Comparative Example 2-1 that has not been subjected to a waterproof treatment; thus, it is confirmed that not only the water-resisting property but also the light-resisting property is improved. Therefore, it has been confirmed that the present invention makes it possible to improve both of the water-resisting property and light-resisting property of the ink-jet recording ink.

Moreover, in all the Examples 2-1 to 2-14, Diethylene glycol monobutyl ether (DEGMBE) may be added thereto as a penetrating agent. In this case, an example of the prepared ink corresponding to Example 2-1 is shown below:

(Example of Prepared Ink)

| Acid yellow 23 | 5% |
| Glycerin | 10% |
| DEGMBE | 10% |
| Organic silicon compound (B) | 5% |
| Pure water | 70% |

(Embodiment 3)

In this embodiment 3 also, the same recording device (see FIGS. 1 to 4) as the above-mentioned embodiment 1 was used, and only the inks to be used therein were different. In other words, in the present embodiment 3, the ink contains a color material, a moisture-retaining agent for suppressing drying in a nozzle 14 or the like of the above-mentioned ink-jet head 1, a penetrating agent for improving the permeability of the ink (solvent) to the recording paper 41, water and a water soluble substance to be subjected to a condensation polymerizing reaction without water.

With respect to the above-mentioned dye used for the color material, any dye may be used; however, a water soluble acidic dye or a direct dye is preferably used.

With respect to the pigment used for the color material, the following pigments are preferably used. In other words, with respect to the black pigment, those pigments formed by coating the carbon black surface with diazonium salt and those formed by subjecting a polymer to a graft polymerization so as to surface-treat the polymer may be preferably used.

Moreover, with respect to the color pigment, those formed by treating a pigment using a surfactant such as a formalin condensation product of naphthalene sulfonate, lignin sulfonic acid, dioctylsulfosuccinate, polyoxyethylene alkyl amine or a fatty acid ester may be preferably used. More specifically, with respect to cyan pigments, examples thereof include: Pigment Blue 15:3, Pigment Blue 15:4 and aluminum phthalocyanine. Furthermore, with respect to magenta pigments, examples thereof include: Pigment Red 122 and Pigment Violet 19. With respect to yellow pigments, examples thereof include: Pigment Yellow 74, Pigment Yellow 109, Pigment Yellow 110 and Pigment Yellow 128.

With respect to the above-mentioned moisture-retaining agent, polyhydric alcohols such as glycerin and 1,3-butane diol, or water soluble nitrogen heterocyclic compounds, such as 2-pyrrolidone and N-methyl-2-pyrrolidone, are preferably used.

With respect to the above-mentioned penetrating agent, mono-alkyl ethers of polyhydric alcohols, such as diethylene glycol mono-butyl ether and 2-butoxyethanol, are preferably used.

The above-mentioned water soluble substance is subjected to a condensation polymerizing reaction on the recording paper 41 when, after the ink droplets, discharged from a nozzle 14 of the ink-jet head 1, have adhered to the recording paper 41, moisture (solvent) evaporates or permeates into the recording paper 41, and allowed to surround the color material so that, even when an image on the recording paper 41 gets wet with water, it is possible to prevent the color material from oozing into water, and consequently to improve the water-resisting property of the image. More specifically, examples thereof include hydrolytic silane compounds and hydrolytic titanium compounds. Of these, hydrolytic silane compounds (organic silicon compounds) are more preferably used from the viewpoint of stability.

Moreover, with respect to the water soluble substance, those compounds having an amino group are more preferably used since these have a higher interaction with the ultraviolet-ray absorbing agent having an acidic group, which will be described later.

With respect to the water soluble substance (organic silicon compound), examples thereof include a hydrolytic reactant between alkoxy silane containing an organic group having an amino group and alkoxy silane containing no amino group, or an organic silicon compound that is obtained by hydrolyzing hydrolytic silane obtained by allowing an organic mono-epoxy compound to react with hydrolytic silane containing an amino group and hydrolytic silane containing no nitrogen atoms.

Further, the ink-jet recording ink relating to the present embodiment 3 further contains an ultraviolet-ray absorbing agent having an acidic group. This ultraviolet-ray absorbing agent has a function for absorbing ultraviolet rays to convert the light energy thereof to heat energy and the like.

With respect to the above-mentioned ultraviolet-ray absorbing agent, specific examples include benzophenone-based compounds, benzotriazole-based compounds, or salicylate-based compounds.

With respect to the acidic group contained in the ultraviolet-ray absorbing agent, examples thereof include: sodium sulfonate and sodium carboxylate, and from the viewpoint of solubility to water, sodium sulfonate is preferably used.

With respect to the benzophenone compound, specific examples thereof include compounds represented by the following formulas 1 to 12. Here, these compounds are easily obtained by subjecting a benzophenone-based compound commercially available as an ultraviolet-ray absorbing agent to sulfonation by using sulfuric acid or subjecting phthalic anhydride to a Friedel-Crafts' reaction with a corresponding phenyl compound.

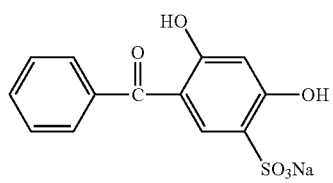
(Formula 1)

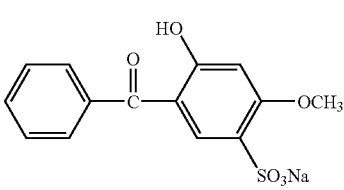
(Formula 2)

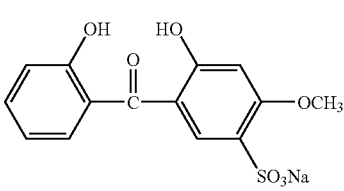
(Formula 3)

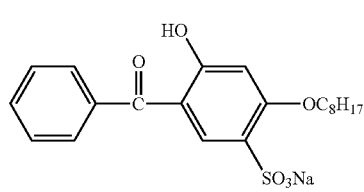
(Formula 4)

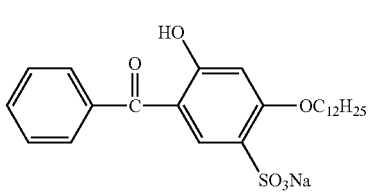
(Formula 5)

-continued

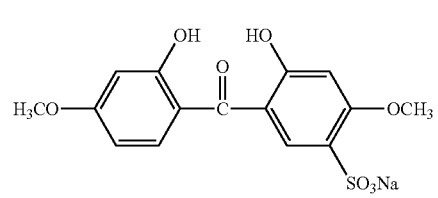
(Formula 6)

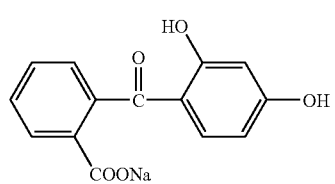
(Formula 7)

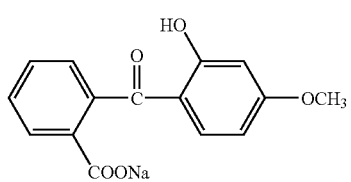
(Formula 8)

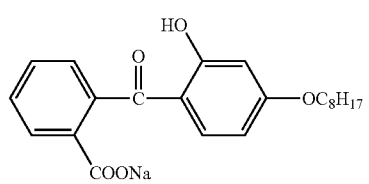
(Formula 9)

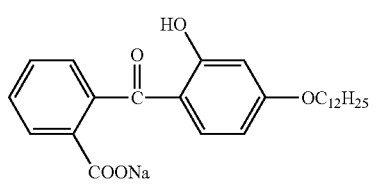
(Formula 10)

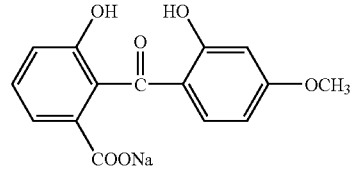
(Formula 11)

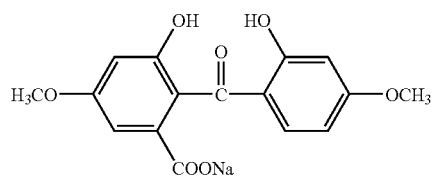
(Formula 12)

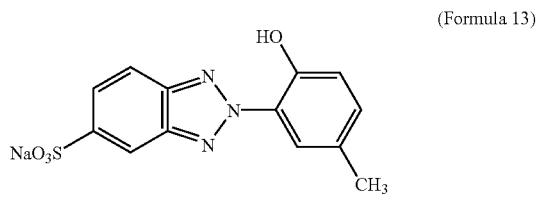
(Formula 13)

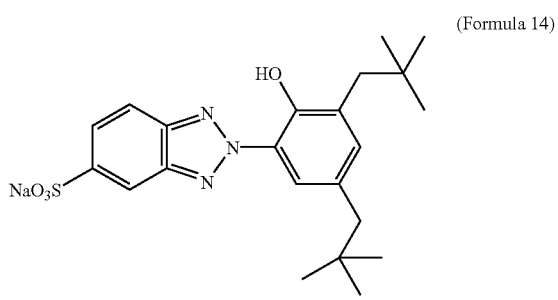
(Formula 14)

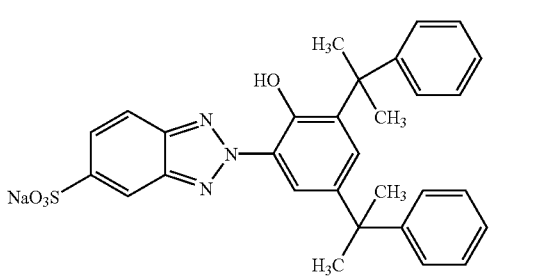
(Formula 15)

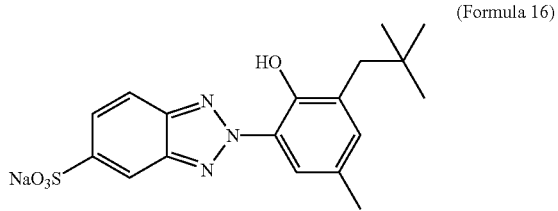
(Formula 16)

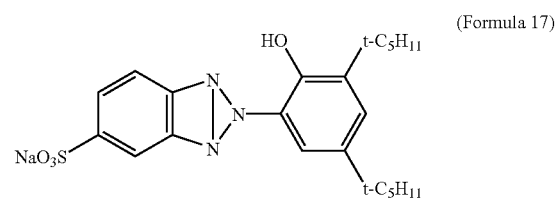
(Formula 17)

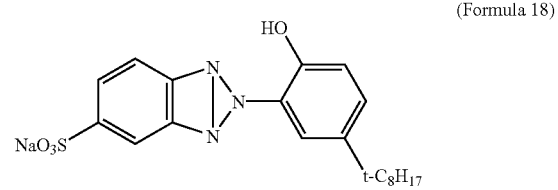
(Formula 18)

Moreover, with respect to the benzotriazole-based compound, specific examples include compounds represented by the following formulas 13 to 18. There compounds are easily obtained by subjecting a benzotriazole-based compound commercially available as an ultraviolet-ray absorbing agent to sulfonation by using sulfuric acid.

Moreover, with respect to the salicylate-based compound, specific examples include compounds represented by the following formulas 19 and 20. These compounds are easily obtained by subjecting a salicylate-based compound commercially available as an ultraviolet-ray absorbing agent to sulfonation by using sulfuric acid.

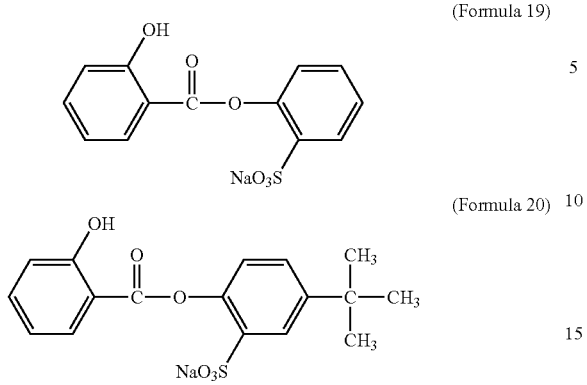

(Formula 19)

(Formula 20)

As described above, in the above-mentioned embodiment 3, the ink-jet recording ink contains a color material, a moisture retaining agent, a penetrating agent, water and a hydrolytic silane compound serving as a water soluble substance that is subjected to a condensation polymerizing reaction without water; therefore, in the case when an image is formed on recording paper 41 with this ink by using a recording device, after ink droplets have adhered to the recording paper 41, the solvent composed of the moisture-retaining agent, the penetrating agent and water is allowed to swiftly permeate into the recording paper 41. With this arrangement, the silane compound is subjected to a condensation polymerizing reaction, and the condensation polymerized silane compound is allowed to surround the color material so that, even when the image on the recording paper 41 gets wet with water, it becomes possible to prevent the color material from oozing into water.

Moreover, the ink relating to the present embodiment 3 further contains an ultraviolet-ray absorbing agent having an acidic group. Since the ultraviolet-ray absorbing agent has an acidic group, it has a strong interaction with a silane compound having an amino group; therefore, the agent is allowed to be positioned in the proximity of the silane compound in the ink in the same manner as the color material. Consequently, when the silane compound is subjected to the condensation polymerizing reaction, not only the color material but also the ultraviolet-ray absorbing agent is surrounded by the silane compound that has been subjected to the condensation polymerizing reaction, with the result that the ultraviolet-ray absorbing agent is located in the proximity of the color material on the recording paper 41. For this reason, even when an image on the recording paper 41 is irradiated with ultraviolet rays, the ultraviolet rays are absorbed by the ultraviolet-ray absorbing agent located in the proximity of the color material, and the light energy thereof is converted into heat energy and the like. Thus, it becomes possible to suppress deterioration of the color material, and consequently to prevent degradation in the light-resisting property effectively.

Moreover, since the above-mentioned ultraviolet-ray absorbing agent is surrounded by the silane compound that has been condensation polymerized so that, even when an image on recording paper 41 gets wet with water, it becomes possible to prevent the ultraviolet-ray absorbing agent from oozing into water. Thus, even after the image has got wet with water, it is possible to obtain an ultraviolet-ray absorbing effect by the ultraviolet-ray absorbing agent, and consequently to continuously suppress degradation in the light preventing property.

Thus, the ink-jet recording ink in accordance with the present embodiment 3 makes it possible to provide a high-level light-resisting property while maintaining a water-resisting property of an image on the recording medium.

In the above-mentioned embodiment 3, a hydrolytic silane compound is contained as the water soluble substance to be subjected to a condensation polymerizing reaction without water; however, any material may be used as long as it is subjected to a condensation polymerizing reaction to surround the color material when ink droplets discharged from the nozzle 14 of the ink-jet head 1 have adhered to recording paper 41 and moisture (solvent) evaporates or permeates into the recording paper 41.

Moreover, in the above-mentioned embodiment 3, although the penetrating agent is contained in the ink, the penetrating agent is not an essential component of the ink in accordance with the present embodiment 3. However, the addition of the penetrating agent to the ink allows the ink solvent to swiftly permeate into the recording paper 41, thereby further improving the water-resisting property in the image.

Next, the following description will discuss examples that were actually carried out. First, nine kinds of ink-jet recording inks having the following compositions (the content of each composition is indicated by mass percentage) were prepared (Examples 3-1 to 3-9).

In all the examples 3-1 to 3-9, glycerin was contained as the moisture-retaining agent.

Moreover, with respect to the color material, a dye was contained therein, JPD Yellow MT-NL (made by Nippon Kayaku Co., Ltd.) was contained in Examples 3-1 to 3-6, and dyes having different colors were contained in Examples 3-7 to 3-9.

Moreover, with respect to the water soluble substance to be subjected to a condensation polymerizing reaction without water, in all the Examples 3-1 to 3-9, an organic silicon compound was contained. This organic silicon compound was prepared by using the following method. In other words, to a reaction container provided with a cooling device 120 g (6.67 moles) of water was put, and to this water was added a mixture of 35 g (0.2 moles) of 1-trimethoxysilyl-3-aminopropane and 15.2 g (0.1 moles) of tetramethoxy silane drop by drop, while being stirred. After all the amount thereof had been dropped, this was stirred for one hour with the temperature of the reaction container being raised to 60° C., and the reaction was continued for 2 hours with the temperature of the reaction container being raised to 90° C., while being stirred. After the reaction, the resultant methanol was removed by distilling. The organic silicon compound thus formed was contained in the respective Examples.

EXAMPLE 3-1

The compound represented by formula 1 was contained as an ultraviolet-ray absorbing agent.

| | |
|---|---|
| JPD Yellow MT-NL (made by Nippon Kayaku K.K.) | 5% |
| Glycerin | 7% |
| Diethylene glycol | 5% |
| Organic silicon compound | 5% |
| Ultraviolet-ray absorbing agent (Formula 1) | 5% |
| Pure water | 73% |

EXAMPLE 3-2

The compound represented by formula 3 was contained as an ultraviolet-ray absorbing agent.

| | |
|---|---|
| JPD Yellow MT-NL (made by Nippon Kayaku K.K.) | 5% |
| Glycerin | 7% |
| Diethylene glycol | 5% |
| Organic silicon compound | 5% |
| Ultraviolet-ray absorbing agent (Formula 3) | 5% |
| Pure water | 73% |

EXAMPLE 3-3

The compound represented by formula 7 was contained as an ultraviolet-ray absorbing agent.

| | |
|---|---|
| JPD Yellow MT-NL (made by Nippon Kayaku K.K.) | 5% |
| Glycerin | 7% |
| Diethylene glycol | 5% |
| Organic silicon compound | 5% |
| Ultraviolet-ray absorbing agent (Formula 7) | 5% |
| Pure water | 73% |

EXAMPLE 3-4

The compound represented by the formula 13 was contained as an ultraviolet-ray absorbing agent.

| | |
|---|---|
| JPD Yellow MT-NL (made by Nippon Kayaku K.K.) | 5% |
| Glycerin | 7% |
| Diethylene glycol | 5% |
| Organic silicon compound | 5% |
| Ultraviolet-ray absorbing agent (Formula 13) | 5% |
| Pure water | 73% |

EXAMPLE 3-5

The compound represented by formula 14 was contained as an ultraviolet-ray absorbing agent.

| | |
|---|---|
| JPD Yellow MT-NL (made by Nippon Kayaku K.K.) | 5% |
| Glycerin | 7% |
| Diethylene glycol | 5% |
| Organic silicon compound | 5% |
| Ultraviolet-ray absorbing agent (Formula 14) | 5% |
| Pure water | 73% |

EXAMPLE 3-6

The compound represented by formula 19 was contained as an ultraviolet-ray absorbing agent.

| | |
|---|---|
| JPD Yellow MT-NL (made by Nippon Kayaku K.K.) | 5% |
| Glycerin | 7% |
| Diethylene glycol | 5% |
| Organic silicon compound | 5% |
| Ultraviolet-ray absorbing agent (Formula 19) | 5% |
| Pure water | 73% |

EXAMPLE 3-7

With respect to Example 3-1, the dye was changed.

| | |
|---|---|
| C. I. Acid Red 289 | 5% |
| Glycerin | 7% |
| Diethylene glycol | 5% |
| Organic silicon compound | 5% |
| Ultraviolet-ray absorbing agent (Formula 1) | 5% |
| Pure water | 73% |

EXAMPLE 3-8

With respect to Example 3-1, the dye was changed.

| | |
|---|---|
| C. I. Direct Blue 199 | 5% |
| Glycerin | 7% |
| Diethylene glycol | 5% |
| Organic silicon compound | 5% |
| Ultraviolet-ray absorbing agent (Formula 1) | 5% |
| Pure water | 73% |

EXAMPLE 3-9

With respect to Example 3-1, the dye was changed.

| | |
|---|---|
| C. I. Direct Black 154 | 5% |
| Glycerin | 7% |
| Diethylene glycol | 5% |
| Organic silicon compound | 5% |
| Ultraviolet-ray absorbing agent (Formula 1) | 5% |
| Pure water | 73% |

Here, for comparative purposes, an ink having the following composition (the content of the composition is indicated by mass percentage) was prepared (Comparative Example 3-1). In this example, a compound represented by the following formula 21 was contained as an ultraviolet-ray absorbing agent. This ultraviolet-ray absorbing agent contained no acidic group.

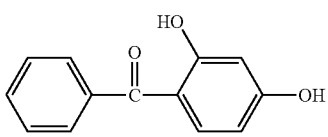

(Formula 21)

COMPARATIVE EXAMPLE 3-1

| | |
|---|---|
| JPD Yellow MT-NL (made by Nippon Kayaku K.K.) | 5% |
| Glycerin | 7% |
| Diethylene glycol | 5% |
| Organic silicon compound | 5% |
| Ultraviolet-ray absorbing agent (Formula 21) | 5% |
| Pure water | 73% |

Then, light-resisting property tests were carried out on the respective inks of Examples 3-1 to 3-9 and Comparative Example 3-1. Print samples used in the light-resisting property tests were obtained by forming a solid printed image in 15 mm squares (printed on the entire surface without gaps) on plain paper (trade name "Xerox 4024": made by Xerox Corporation) with the above-mentioned inks by using a commercial printer.

Moreover, in the light-resisting property tests, after a lapse of 10 minutes from the printing process, the resulting print sample was immersed in distilled water with its printed surface facing down, and the print sample that had been naturally dried for 30 minutes after the immersing process was measured in its OD value, and after the corresponding print sample had been irradiated with light having an illuminance of 100 W/m$^2$ for 500 hours by Ci5000 Xenon Weather-Ometer (manufactured by Atlas), the ink sample was measured in its OD value. The evaluation of the light-resisting property was made based upon a ratio (light-resisting property (%)) of OD values before and after the light irradiation. Table 3 shows the results of the light-resisting property tests.

TABLE 3

| | | Light-resisting property (%) |
|---|---|---|
| Examples | 3-1 | 95 |
| | 3-2 | 96 |
| | 3-3 | 95 |
| | 3-4 | 97 |
| | 3-5 | 97 |
| | 3-6 | 95 |
| | 3-7 | 95 |
| | 3-8 | 98 |
| | 3-9 | 96 |
| Comparative Example 3-1 | | 71 |

Table 3 shows that each of the inks of Examples 3-1 to 3-9 has a light-resisting property of not less than 95%, while the ink of Comparative Example 3-1 has a light-resisting property of not more than 80%.

It is supposed based upon the results thereof that the ink of comparative example 3-1, which has ultraviolet-ray absorbing agent having no acidic group, has no interaction between the ultraviolet-ray absorbing agent and the water soluble substance (organic silicon compound) and that when the water soluble substance is subjected to a condensation polymerizing reaction, the ultraviolet-ray absorbing agent is not surrounded by the condensation polymerized reactant. For this reason, it is considered that, when the image formed by the ink of Comparative Example 3-1 gets wet with water, the ultraviolet-ray absorbing agent oozes into water to be washed away to cause degradation in the light-resisting property.

In contrast, in the inks relating to Examples 3-1 to 3-9, since the ultraviolet-ray absorbing agent has an acidic group, a strong interaction is exerted between the ultraviolet-ray absorbing agent and the water soluble substance (organic silicon compound). For this reason, it is assumed that when the water soluble substance is subjected to a condensation polymerizing reaction, the ultraviolet-ray absorbing agent is surrounded by the condensation-polymerized reactant together with the color material. Thus, even when an image formed by each of the inks of Examples 3-1 to 3-9 gets wet with water, it is possible to prevent the ultraviolet-ray absorbing agent from being washed away, and consequently to greatly improve the light-resisting property.

When water resisting tests were carried out by the inks of the above-mentioned Examples 3-1 to 3-9 as well as Comparative Example 3-1, it was confirmed that any of the inks make it possible to provide a high water-resisting property.

Moreover, in the above-mentioned formulas 1 to 20, with respect to inks in which another ultraviolet-ray absorbing agent, not shown as Examples 3-1 to 3-9, was contained, it was confirmed that the same light-resisting property as the above-mentioned Examples 3-1 to 3-9 was obtained. Moreover, even in the case when a pigment was contained in each of the inks in Examples 3-1 to 3-9 as the color material in place of the dye to form an ink, it was confirmed that the same results could be obtained.

What is claimed is:

1. An ink-jet recording ink comprising: a color material, water, a moisture-retaining agent, an organic silicon compound,
   wherein at least one portion of said organic silicon compound forms an ultraviolet-ray absorbing part which is a cyanoacrylate-based functional group or an oxalic acid anilide-based functional group,
   wherein the organic silicon compound having the ultraviolet-ray absorbing part is contained in a range of 0.1 to 50 parts by weight with respect to 100 parts by weight of ink.

2. The ink-jet recording ink according to claim 1, further comprising a penetrating agent.

3. An ink cartridge comprising the ink-jet recording inks disclosed in claim 1.

4. A recording device comprising said ink-jet recording inks disclosed in claim 1, wherein a recording process is carried out by discharging said ink onto a recording medium.

5. An ink-jet recording ink comprising: a color material, water, a moisture-retaining agent and an organic silicon compound,
   wherein at least one portion of said organic silicon compound forms an ultraviolet-ray absorbing part which is a cyanoacrylate-based functional group or an oxalic acid anilide-based functional group.

6. The ink-jet recording ink according to claim 5, further comprising a penetrating agent.

7. An ink cartridge comprising the ink-jet recording inks disclosed in claim 5.

8. A recording device comprising said ink-jet recording inks disclosed in claim 5, wherein a recording process is carried out by discharging said ink onto a recording medium.

* * * * *